United States Patent
Lee et al.

(10) Patent No.: US 11,236,224 B2
(45) Date of Patent: Feb. 1, 2022

(54) THERMOPLASTIC RESIN COMPOSITION, METHOD OF PREPARING THE SAME, AND MOLDED PART MANUFACTURED USING THE SAME

(71) Applicant: LG CHEM, LTD., Seoul (KR)

(72) Inventors: Ju Hyeong Lee, Daejeon (KR); Byoung Il Kang, Daejeon (KR); Se Jin Han, Daejeon (KR)

(73) Assignee: LG CHEM, LTD., Seoul (KR)

( * ) Notice: Subject to any disclaimer, the term of this patent is extended or adjusted under 35 U.S.C. 154(b) by 367 days.

(21) Appl. No.: 16/325,138

(22) PCT Filed: Nov. 13, 2017

(86) PCT No.: PCT/KR2017/012813
§ 371 (c)(1),
(2) Date: Feb. 12, 2019

(87) PCT Pub. No.: WO2019/059452
PCT Pub. Date: Mar. 28, 2019

(65) Prior Publication Data
US 2021/0179839 A1     Jun. 17, 2021

(30) Foreign Application Priority Data
Sep. 19, 2017  (KR) .................. 10-2017-0120158

(51) Int. Cl.
| | |
|---|---|
| *C08L 25/12* | (2006.01) |
| *C08L 55/02* | (2006.01) |
| *C23C 18/16* | (2006.01) |
| *C23C 18/20* | (2006.01) |
| *B29C 45/00* | (2006.01) |
| *C25D 3/04* | (2006.01) |
| *C25D 3/12* | (2006.01) |
| *C25D 3/38* | (2006.01) |
| *C25D 5/56* | (2006.01) |
| *B29K 55/02* | (2006.01) |
| *C25D 5/14* | (2006.01) |

(52) U.S. Cl.
CPC .......... *C08L 25/12* (2013.01); *B29C 45/0001* (2013.01); *B29C 45/0053* (2013.01); *C08L 55/02* (2013.01); *C23C 18/1641* (2013.01); *C23C 18/2046* (2013.01); *C25D 3/04* (2013.01); *C25D 3/12* (2013.01); *C25D 3/38* (2013.01); *C25D 5/56* (2013.01); *B29C 2045/0079* (2013.01); *B29K 2055/02* (2013.01); *C08L 2205/02* (2013.01); *C08L 2205/035* (2013.01); *C25D 5/14* (2013.01)

(58) Field of Classification Search
CPC . C08L 55/02; C08L 2205/035; C08L 2205/02
See application file for complete search history.

(56) References Cited

U.S. PATENT DOCUMENTS

| | | | |
|---|---|---|---|
| 2002/0028878 A1 | 3/2002 | Shin et al. | |
| 2005/0199587 A1 | 9/2005 | Bengston | |
| 2009/0092757 A1* | 4/2009 | Satou | C23C 18/24 |
| | | | 427/304 |
| 2010/0048798 A1 | 2/2010 | You et al. | |
| 2014/0114001 A1* | 4/2014 | Choi | C08L 69/00 |
| | | | 524/127 |
| 2017/0335088 A1* | 11/2017 | Noguchi | C03C 13/00 |
| 2019/0284392 A1* | 9/2019 | Shindo | C08L 35/06 |
| 2020/0216664 A1* | 7/2020 | Matsuoka | C08F 285/00 |

FOREIGN PATENT DOCUMENTS

| | | |
|---|---|---|
| CN | 1305512 A | 7/2001 |
| CN | 101665606 A | 3/2010 |
| CN | 101768320 A | 7/2010 |
| CN | 104109537 A | 10/2014 |
| EP | 2792702 A1 | 10/2014 |
| JP | 2002518539 A | 6/2002 |
| JP | 2014212319 A | 11/2014 |
| KR | 1020010052949 A | 6/2001 |
| KR | 101020054 B1 | 3/2011 |
| KR | 1020130006551 A | 1/2013 |
| KR | 1020150067478 A | 6/2015 |
| KR | 10-2016-0064510 A | 6/2016 |
| KR | 1020170025900 A | 3/2017 |
| KR | 1020170047552 A | 5/2017 |
| WO | WO9965991 A1 | 12/1999 |

OTHER PUBLICATIONS

Office Action dated Dec. 30, 2020 for Chinese Application No. 201780059399.2.
Supplementary European Search Report dated Jul. 3, 2019 for Application No. EP17917221.
International Search Report for PCT/KR2017/012813 dated Jun. 1, 2018.

* cited by examiner

*Primary Examiner* — Jeffrey C Mullis

(57) ABSTRACT

Disclosed are a thermoplastic resin composition, a method of preparing the same, and a molded part manufactured using the same, wherein the thermoplastic resin composition includes a-1) 1 to 30% by weight of a first graft polymer obtained by graft-polymerizing an aromatic vinyl compound and a vinyl cyanide compound onto a conjugated diene rubber having an average particle diameter of 0.05 μm or more and less than 0.2 μm; a-2) 5 to 45% by weight of a second graft polymer obtained by graft-polymerizing an aromatic vinyl compound and a vinyl cyanide compound onto a conjugated diene rubber having an average particle diameter of 0.2 to 0.5 μm; b) 50 to 80% by weight of an aromatic vinyl compound-vinyl cyanide compound copolymer; and c) 1 to 10% by weight of a (meth)acrylic acid alkyl ester polymer.

13 Claims, No Drawings

THERMOPLASTIC RESIN COMPOSITION, METHOD OF PREPARING THE SAME, AND MOLDED PART MANUFACTURED USING THE SAME

CROSS-REFERENCE TO RELATED APPLICATION

This application is a National Stage Application of PCT/KR2017/012813 filed Nov. 13, 2017, which claims priority to Korean Patent Application No. 10-2017-0120158, filed on Sep. 19, 2017 in the Korean Intellectual Property Office, the disclosures of which are incorporated herein by reference.

TECHNICAL FIELD

The present invention relates to a thermoplastic resin composition, a method of preparing the same, and a molded part manufactured using the same, and more particularly, to a thermoplastic resin composition having mechanical properties equal to or better than those of conventional thermoplastic resin compositions, a method of preparing the same, and a molded part manufactured using the same. According to the present invention, the thermoplastic resin composition has excellent plating adhesion, heat cycle characteristics, and appearance during a plating process using a chromium-free etchant with reduced toxicity. Further, since use of the thermoplastic resin composition does not cause increase in process cost, the present invention may provide economic advantages.

BACKGROUND ART

Acrylonitrile-butadiene-styrene (ABS) resins have excellent rigidity and chemical resistance derived from acrylonitrile and excellent processability, mechanical strength, and aesthetics derived from butadiene and styrene. With these properties, ABS resins are used in a variety of products, such as automobile parts, electric/electronic products, and office equipment.

ABS resins are often subjected to plating. A plating process is performed in the order of degreasing, etching, neutralization, catalysis, activation, chemical plating, and electroplating. The etching process is a step of melting a rubber portion within an ABS resin to form irregularities on the surface of the resin, thereby forming holes. These holes serve as anchor sites to provide physical adhesion between the resin and a plating layer. Thus, the etching process is an essential step to provide plating adhesion and prevent occurrence of non-plating.

An etchant used to etch conventional ABS resins includes hexavalent chromium ($Cr^{6+}$) of chromium anhydride, which is designated as a human carcinogen. Thus, the etchant may be harmful to workers. In addition, for safe wastewater treatment of the etchant, a complicated process of reducing hexavalent chromium to trivalent chromium and neutralizing and precipitating the reduced trivalent chromium must be performed. Accordingly, a chromium-free plating process with reduced toxicity has been developed in consideration of worker safety and wastewater treatment.

However, compared to the conventional process (using an etchant), in the case of the plating process with reduced toxicity, plating adhesion may be lowered or non-plating may occur. This causes another problem that thermal cycle properties are easily deteriorated.

As a method for solving these problems, a method of increasing rubber content has been proposed, but this may cause deterioration in thermal cycle properties due to decrease in moldability and increase in coefficient of linear expansion. As another method, there is a method of increasing etching temperature or time during a plating process, but the method increases overall process time, which is undesirable in terms of efficiency and process cost. Thus, use of the method is avoided in the related art.

Therefore, there is increasing demand for a resin composition exhibiting, during a chromium-free plating process with reduced toxicity, improvement in plating adhesion and reduction in a non-plating phenomenon without showing any deterioration in the intrinsic mechanical and thermal properties of ABS resins.

PRIOR ART DOCUMENT

[Patent Document] (Patent Document 1) KR 10-2013-0006551 A

DISCLOSURE

Technical Problem

Therefore, the present invention has been made in view of the above problems, and it is one object of the present invention to provide a thermoplastic resin composition having excellent appearance. According to the present invention, during a chromium-free plating process with reduced toxicity, the thermoplastic resin composition exhibits excellent plating adhesion without showing any deterioration in mechanical and thermal properties, and a non-plating phenomenon is greatly reduced when the thermoplastic resin composition is used. Thus, the thermoplastic resin composition after the plating process has excellent appearance.

It is another object of the present invention to provide a method of preparing the thermoplastic resin composition and a molded part manufactured using the thermoplastic resin composition.

The above and other objects of the present invention can be accomplished by the present disclosure described below.

Technical Solution

In accordance with one aspect of the present invention, provided is a thermoplastic resin composition including a-1) 1 to 30% by weight of a first graft polymer obtained by graft-polymerizing an aromatic vinyl compound and a vinyl cyanide compound onto a conjugated diene rubber having an average particle diameter of 0.05 μm or more and less than 0.2 μm; a-2) 5 to 45% by weight of a second graft polymer obtained by graft-polymerizing an aromatic vinyl compound and a vinyl cyanide compound onto a conjugated diene rubber having an average particle diameter of 0.2 to 0.5 μm; b) 50 to 80% by weight of an aromatic vinyl compound-vinyl cyanide compound copolymer; and c) 1 to 10% by weight of a (meth)acrylic acid alkyl ester polymer.

In accordance with another aspect of the present invention, provided is a method of preparing a thermoplastic resin composition, including a step of kneading and extruding a-1) 1 to 30% by weight of a first graft polymer obtained by graft-polymerizing an aromatic vinyl compound and a vinyl cyanide compound onto a conjugated diene rubber having an average particle diameter of 0.05 μm or more and less than 0.2 μm; a-2) 5 to 45% by weight of a second graft polymer obtained by graft-polymerizing an aromatic vinyl compound and a vinyl cyanide compound onto a conjugated diene rubber having an average particle diameter of 0.2 to 0.5 μm;

b) 50 to 80% by weight of an aromatic vinyl compound-vinyl cyanide compound copolymer; and c) 1 to 10% by weight of a (meth)acrylic acid alkyl ester polymer.

In accordance with another aspect of the present invention, provided is a method of manufacturing a molded part, including a step in which the thermoplastic resin composition is subjected to injection molding to obtain an injection-molded part; a step of etching the injection-molded part using a chromium-free etchant containing $KMnO_4$ and phosphoric acid; and a step of plating the etched injection-molded part.

In accordance with yet another aspect of the present invention, provided is a molded part including the thermoplastic resin composition of the present invention.

Advantageous Effects

As apparent from the foregoing, the present invention advantageously provides a thermoplastic resin composition having mechanical properties equal to or better than those of conventional thermoplastic resin compositions, a method of preparing the same, and a molded part manufactured using the same. According to the present invention, the thermoplastic resin composition has excellent plating adhesion and thermal cycle characteristics during a plating process using a chromium-free etchant with reduced toxicity. Further, since use of the thermoplastic resin composition does not cause increase in process cost, the present invention can provide economic advantages.

BEST MODE

Hereinafter, the thermoplastic resin composition of the present invention will be described in detail.

The present inventors confirmed that, when a resin composition prepared by mixing two types of ABS resins each containing rubber particles having different average particle diameters, a styrene-acrylonitrile copolymer, and a polymethyl methacrylate (PMMA) resin within specific content ranges was subjected to a plating process with reduced toxicity, the prepared resin composition exhibited excellent plating adhesion without showing any deterioration in mechanical and thermal properties, and a non-plating phenomenon was greatly reduced. Based on these findings, the present invention was completed.

In the present invention, a plating process with reduced toxicity includes an etching process using a chromium-free etchant, and the term "chromium-free" means that chromium-containing components designated as toxic chemicals are not intentionally added to a composition.

For example, the chromium-free etchant may be a solution containing permanganic acid (or salts thereof) and various inorganic or organic acids. As a specific example, the chromium-free etchant may be a solution containing permanganic acid (or salts thereof) and phosphoric acid.

The thermoplastic resin composition of the present invention includes a-1) 1 to 30% by weight of a first graft polymer obtained by graft-polymerizing an aromatic vinyl compound and a vinyl cyanide compound onto a conjugated diene rubber having an average particle diameter of 0.05 μm or more and less than 0.2 μm; a-2) 5 to 45% by weight of a second graft polymer obtained by graft-polymerizing an aromatic vinyl compound and a vinyl cyanide compound onto a conjugated diene rubber having an average particle diameter of 0.2 to 0.5 μm; b) 50 to 80% by weight of an aromatic vinyl compound-vinyl cyanide compound copolymer; and c) 1 to 10% by weight of a (meth)acrylic acid alkyl ester polymer.

Each of the first and second graft copolymers may be obtained by graft-polymerizing an aromatic vinyl compound and a vinyl cyanide compound onto a conjugated diene rubber. The conjugated diene rubber may be, for example, a latex in which a conjugated diene rubber is dispersed in water to form a colloid.

The conjugated diene rubber refers to a polymer or copolymer obtained by polymerizing conjugated diene compounds in which a double bond and a single bond are alternately arranged, and may be, as a specific example, one or more selected from a butadiene polymer, a butadiene-styrene copolymer, and a butadiene-acrylonitrile copolymer, preferably a butadiene polymer. In this case, the mechanical strength and processability of the composition may be excellent.

For example, the conjugated diene rubber of the first graft copolymer (a-1) may have an average particle diameter of 0.05 μm or more and less than 0.2 μm, 0.05 to 0.18 μm, or 0.07 to 0.15 μm. Within this range, mechanical properties, processability, and thermal cycle characteristics may be excellent.

For example, the conjugated diene rubber of the second graft copolymer (a-2) may have an average particle diameter of 0.2 to 0.5 μm, 0.23 to 0.45 μm, or 0.25 to 0.4 μm. Within this range, mechanical properties, plating properties, and processability may be excellent.

In the present invention, the average particle diameter of the conjugated diene rubber may be measured, for example, using intensity Gaussian distribution (Nicomp 380) according to Dynamic Laser Light Scattering.

For example, each of the first and second graft copolymers may include one or more selected from styrene, α-methylstyrene, p-methylstyrene, and vinyltoluene, preferably styrene, as an aromatic vinyl compound. In this case, processability and mechanical properties may be excellent.

For example, each of the first and second graft copolymers may include one or more selected from acrylonitrile, methacrylonitrile, and ethacrylonitrile, preferably acrylonitrile, as a vinyl cyanide compound. In this case, the mechanical strength, processability, and plating properties of the composition may be excellent.

For example, each of the first and second graft copolymers may be obtained by graft-polymerizing 10 to 70% by weight of an aromatic vinyl compound and 1 to 30% by weight of a vinyl cyanide compound onto 20 to 80% by weight of a conjugated diene rubber, with respect to the total weight of each copolymer. In this case, overall physical property balance may be improved, and plating adhesion and thermal cycle characteristics may be excellent.

As another example, each of the first and second graft copolymers may be obtained by graft-polymerizing 15 to 65% by weight of an aromatic vinyl compound and 3 to 25% by weight of a vinyl cyanide compound onto 30 to 75% by weight of a conjugated diene rubber, with respect to the total weight of each copolymer. Within this range, physical properties, such as impact resistance and processability, plating adhesion, and thermal cycle characteristics may be excellent.

As another example, each of the first and second graft copolymers may be obtained by graft-polymerizing 20 to 60% by weight of an aromatic vinyl compound and 5 to 20% by weight of a vinyl cyanide compound onto 45 to 70% by weight of a conjugated diene rubber, with respect to the total weight of each copolymer. In this case, the physical property balance, plating adhesion, and appearance of the composition may be excellent.

For example, the first graft copolymer may be included in the composition in an amount of 1 to 30% by weight, 1 to 25% by weight, 5 to 20% by weight, or 5 to 15% by weight. Within this range, the impact resistance, fluidity, and plating adhesion of the composition may be excellent.

For example, the second graft copolymer may be included in the composition in an amount of 5 to 45% by weight, 10 to 45% by weight, 10 to 35% by weight, or 15 to 30% by weight. Within this range, the physical property balance of the composition, such as mechanical properties and processability, may be excellent, and plating adhesion may also be excellent.

For example, the weight ratio of the first graft copolymer to the second graft copolymer may be 1:0.5 to 1:4, 1:1.5 to 1:3.5, or 1:2 to 1:3. Within this range, the impact resistance, processability, plating adhesion, and thermal cycle characteristics of the composition may be excellent, and occurrence of non-plating may be reduced.

A method of preparing the first graft copolymer (a-1) and the second graft copolymer (a-2) is not particularly limited, and a method commonly used in the art may be appropriately selected. As a preferred example, the first and second graft copolymers may be prepared by conventional emulsion polymerization methods. In this case, grafting efficiency may be excellent, and thus mechanical properties and processability may be further improved.

The aromatic vinyl compound-vinyl cyanide compound copolymer (b) is a non-graft copolymer obtained by polymerizing an aromatic vinyl compound and a vinyl cyanide compound. For example, the vinyl cyanide compound may be included in an amount of 10 to 40% by weight, 15 to 40% by weight, or 20 to 35% by weight with respect to the total weight of the copolymer (b). Within this range, the fluidity of the composition is appropriate, and thus the processability of the composition may be excellent, and, in an etching process using a chromium-free etchant, irregularities are sufficiently formed on the surface of a resin, so that plating adhesion and appearance may be excellent.

The aromatic vinyl compound may be, for example, one or more selected from styrene, α-methylstyrene, p-methylstyrene, and vinyltoluene, and the vinyl cyanide compound may be, for example, one or more selected from acrylonitrile, methacrylonitrile, and ethacrylonitrile, preferably styrene-acrylonitrile copolymer. In this case, the mechanical strength and processability of the composition may be excellent, and plating adhesion may be improved.

For example, the weight average molecular weight of the aromatic vinyl compound-vinyl cyanide compound copolymer may be 50,000 to 200,000 g/mol, 60,000 to 190,000 g/mol, 70,000 to 180,000 g/mol, 80,000 to 140,000 g/mol, or 80,000 to 120,000 g/mol. Within this range, fluidity is appropriate, and thus processability may be excellent. In addition, mechanical strength, such as impact strength, and plating adhesion may be improved.

In the present invention, for example, a resin was dissolved in tetrahydrofuran (THF) at a concentration of 1 mg/ml and filtered through a 0.45 μm syringe filter, and weight average molecular weight was measured using GPC. At this time, calibration was performed using polymethyl methacrylate (PMMA) as a standard material, and then molecular weight was measured.

A method of preparing the copolymer (b) is not particularly limited, and a method commonly used in the art may be appropriately selected. Preferably, the copolymer is prepared using a bulk polymerization method. More preferably, the copolymer is prepared using a continuous bulk polymerization method in consideration of reduction of production costs.

To improve plating adhesion and reduce a non-plating phenomenon while improving mechanical properties, thermal properties, and processability during a plating process with reduced toxicity, the (meth)acrylic acid alkyl ester polymer (c) is added.

For example, the (meth)acrylic acid alkyl ester polymer may be included in the composition in an amount of 1 to 10% by weight, 3 to 10% by weight, 5 to 10% by weight, 5 to 8% by weight, or 3 to 7% by weight. Within this range, the mechanical and thermal properties, processability of the composition may be excellent, and plating adhesion properties may be improved.

For example, the (meth)acrylic acid alkyl ester polymer may be obtained by polymerizing (meth)acrylic acid alkyl ester compounds containing an alkyl group having 1 to 20 carbon atoms. As a specific example, the (meth)acrylic acid alkyl ester polymer may be obtained by polymerizing one or more selected from methyl acrylate, ethyl acrylate, methyl methacrylate, ethyl methacrylate, and methyl ethacrylate, and is preferably a methyl methacrylate homopolymer. In this case, the physical property balance and plating adhesion of the composition may be improved and a non-plating phenomenon may be reduced, so that the appearance of the composition may be excellent.

As another example, the (meth)acrylic acid alkyl ester polymer may be a block copolymer composed of a (meth)acrylic acid alkyl ester polymer and an aromatic vinyl compound-vinyl cyanide compound copolymer; a master batch of a (meth)acrylic acid alkyl ester polymer using an aromatic vinyl compound-vinyl cyanide compound copolymer as a base resin; or both. In this case, compatibility between the first graft copolymer, the second graft copolymer, and the aromatic vinyl compound-vinyl cyanide compound copolymer may be improved, so that the mechanical properties, processability, and thermal properties of the composition may be excellent, and plating adhesion may be improved.

More preferably, the (meth)acrylic acid alkyl ester polymer is a block copolymer composed of a (meth)acrylic acid alkyl ester polymer and an aromatic vinyl compound-vinyl cyanide compound copolymer. In this case, physical property balance and plating properties may be further improved.

The resin composition of the present invention may optionally further include one or more additives selected from the group consisting of a heat stabilizer, an antioxidant, an impact modifier, a light stabilizer, a plasticizer, a lubricant, an antistatic agent, and a toning agent. For example, the additive may be used in an amount of 0.1 to 5 parts by weight or 0.5 to 3 parts by weight with respect to 100 parts by weight of the total composition. Within this range, physical properties may be improved, and production costs may be reduced.

For example, the thermoplastic resin composition according to the present invention may have a melt index of 14 to 40 g/10 min, 15 to 35 g/10 min, or 15 to 30 g/10 min. In this case, fluidity is appropriate, and thus processability may be excellent.

For example, the thermoplastic resin composition according to the present invention may have an impact strength of 20 kgfcm/cm$^2$ or more, 20 to 30 kgfcm/cm$^2$, or 28 to 30 kgfcm/cm$^2$.

For example, the thermoplastic resin composition according to the present invention may have a plating adhesion of 8.0 N/cm or more, 9.0 to 12 N/cm, or 9.0 to 10 N/cm. Within this range, appearance after plating may be excellent.

Hereinafter, a method of preparing the thermoplastic resin composition of the present invention and a molded part including the composition will be described in detail. In describing the method of preparing the composition of the present invention and the molded part, descriptions overlapping with the above-described thermoplastic resin composition will be omitted.

The method of preparing a thermoplastic resin composition according to the present invention includes a step of kneading and extruding a-1) 1 to 30% by weight of a first graft polymer obtained by graft-polymerizing an aromatic vinyl compound and a vinyl cyanide compound onto a conjugated diene rubber having an average particle diameter of 0.05 μm or more and less than 0.2 μm; a-2) 5 to 45% by weight of a second graft polymer obtained by graft-polymerizing an aromatic vinyl compound and a vinyl cyanide compound onto a conjugated diene rubber having an average particle diameter of 0.2 to 0.5 μm; b) 50 to 80% by weight of an aromatic vinyl compound-vinyl cyanide compound copolymer; and c) 1 to 10% by weight of a (meth)acrylic acid alkyl ester polymer.

When the step of kneading is performed, the above-described additives, such as a heat stabilizer, an antioxidant, an impact modifier, a light stabilizer, a plasticizer, a lubricant, and an antistatic agent, may be further included.

For example, the step of kneading and extruding may be performed using a single screw extruder, a twin-screw extruder, a Banbury mixer, or the like. Using the equipment, the composition is homogeneously mixed and then extruded to obtain, for example, a thermoplastic resin composition in the form of a pellet.

Further, the thermoplastic resin composition obtained according to the above preparation method may be manufactured as a molded part through an injection process.

As described above, the thermoplastic resin composition of the present invention may be a plating material, and a plating process using a chromium-free etchant with reduced toxicity may be used to plate the composition. As a specific example, the molded part may be manufactured by a method including a step in which the thermoplastic resin composition is subjected to injection molding to obtain an injection-molded part; a step of etching the injection-molded part using a chromium-free etchant containing $KMnO_4$ and phosphoric acid; and a step of plating the etched injection-molded part.

For example, in the step of etching, etching time may be 5 to 15 minutes or 7 to 10 minutes, and etching temperature may be 60 to 75° C. or 65 to 70° C. Within this range, a molded part having excellent plating adhesion and appearance may be obtained without increasing process cost.

In the step of plating, a plating method is not particularly limited, and a method commonly used in the art may be appropriately selected and used.

Uses of the molded part may include, for example, interior or exterior materials for automobiles, without being limited thereto.

In describing the thermoplastic resin composition, the molded part, and the method for preparing the same according to the present invention, in the case of components not explicitly described herein, components commonly used in the art are not particularly limited and may be appropriately selected and used.

Hereinafter, the present invention will be described in more detail with reference to the following preferred examples. However, these examples are provided for illustrative purposes only and should not be construed as limiting the scope and spirit of the present invention. In addition, it will be apparent to those skilled in the art that various changes and modifications may be made without departing from the spirit and scope of the present invention, and such changes and modifications are also within the scope of the appended claims.

Materials used in Examples and Comparative Examples are as follows.

a-1) First graft copolymer: an ABS resin (DP229M, LG Chem.) obtained by performing emulsion polymerization using rubber having an average particle diameter of 0.1 μm a-2) Second graft copolymer: an ABS resin (DP270M, LG Chem.) obtained by performing emulsion polymerization using rubber having an average particle diameter of 0.3 μm b) Aromatic vinyl compound-vinyl cyanide compound copolymer: a styrene-acrylonitrile copolymer (SNA) (95HCI, LG Chem.)

c) (Meth)acrylic acid alkyl ester polymer: polymethyl methacrylate (PMMA) (XT510, LG Chem.)

EXAMPLES AND COMPARATIVE EXAMPLES

Each component was added to a twin-screw extruder according to the composition and contents shown in Table 1 below and melted and kneaded at 220° C. to obtain a resin composition in the form of a pellet. The obtained resin composition was subjected to injection molding to prepare specimens for measuring physical properties. In this case, the specimens were formed into a square shape with a size of 100 mm×100 mm×3 mm or a cap shape with a size of 150 mm×80 mm×3 mm.

A plating layer having a uniform thickness of 30 μm or more was formed on the prepared specimens by the following plating method.

First, the specimens were treated with a surfactant at 55° C. for 5 minutes to remove oil and incubated in a chromium-free etchant containing 25 g/L of $KMnO_4$ and 600 ml/L of phosphoric acid at 68° C. for 10 minutes to oxidize butadiene. Then, the specimens were incubated in the presence of a palladium-tin catalyst at 30° C. for 2 minutes to adsorb palladium in the anchor holes of the specimens. An activation step was conducted at 55° C. for 2 minutes, and tin was removed using an aqueous solution of sulfuric acid, and electroless plating was performed at 30° C. for 5 minutes using nickel sulfate. After electroless plating, electroplating was performed using copper, nickel, and chromium. In this case, copper electroplating using copper sulfate was conducted at 25° C. for 35 minutes at 3 $A/dm^2$, nickel electroplating using nickel sulfate was conducted at 55° C. for 15 minutes at 3 $A/dm^2$, and chromium electroplating using a chromic anhydride solution was conducted at 55° C. for 3 minutes at 15 $A/dm^2$.

TABLE 1

| Classification | Examples | | | | | | | Comparative Examples | | | | | | |
| --- | --- | --- | --- | --- | --- | --- | --- | --- | --- | --- | --- | --- | --- | --- |
| | 1 | 2 | 3 | 4 | 5 | 6 | 7 | 1 | 2 | 3 | 4 | 5 | 6 | 7 |
| a-1 | 10 | 10 | 10 | 20 | 10 | 10 | 10 | 10 | 10 | 30 | — | 10 | 10 | 10 |
| a-2 | 20 | 20 | 20 | 10 | 30 | 20 | 20 | 20 | 20 | — | 30 | 20 | 20 | 20 |
| b | 69 | 65 | 60 | 65 | 55 | 67 | 63 | 70 | 55 | 65 | 65 | 57 | 69.7 | 69.3 |
| c | 1 | 5 | 10 | 5 | 5 | 3 | 7 | — | 15 | 5 | 5 | 13 | 0.3 | 0.7 |

(The content of each component in Table 1 is given in % by weight based on the total weight of a-1, a-2, b, and c)

Test Example

The properties of specimens prepared according to Examples and Comparative Examples were measured by the following methods, and results are shown in Table 2.

Melt index (g/10 min): The melt indexes of the prepared specimens were measured at 220° C. and 10 kg according to ASTM D1238.

Impact strength (Notched Izod Impact Strength, kgfcm/cm$^2$): The impact strength of the specimens was measured according to ASTM D256 using specimens having a thickness of 6.4 mm.

Evaluation of plating adhesion: A 10 mm-wide scratch was applied to the front face of a plated square specimen (size: 100 mm×100 mm×3 mm), and the degree of plating adhesion was measured while peeling the specimen by a distance of 80 mm in the vertical direction using a push-pull gauge. The average value of the measured values was calculated.

Evaluation of non-plating occurrence: The appearance of a cap-shaped specimen of 150 mm×80 mm×3 mm was observed with the naked eye. At this time, when non-plating did not occur on the specimen, it was indicated by ○. When non-plating occurred on a portion of the specimen, it was indicated by X.

Thermal cycle characteristics: Cap-shaped specimens were subjected to the following processes ① to ⑤ in a chamber, and the appearance of a plating layer was observed with the naked eye. At this time, when no cracks or plating bulges were observed, it was indicated by ○. When cracks or plating bulges were observed on a portion of the specimen, it was indicated by X.

① The temperature in the chamber is maintained at −40° C. for 60 minutes.

② The temperature in the chamber is raised to 80° C. within 1 minute.

③ The temperature in the chamber is maintained at 80° C. for 60 minutes.

④ The temperature in the chamber is cooled to −40° C. within 1 minute.

⑤ Processes ① to ④ are repeated four times.

TABLE 2

| Classification | Examples | | | | | | | Comparative Examples | | | | | | |
| --- | --- | --- | --- | --- | --- | --- | --- | --- | --- | --- | --- | --- | --- | --- |
| | 1 | 2 | 3 | 4 | 5 | 6 | 7 | 1 | 2 | 3 | 4 | 5 | 6 | 7 |
| Melt index (g/10 min) | 21 | 18 | 15 | 15 | 14 | 20 | 16 | 22 | 15 | 10 | 12 | 16 | 22 | 21 |
| Impact strength (kgfcm/cm$^2$) | 25 | 23 | 20 | 21 | 28 | 24 | 22 | 26 | 14 | 12 | 18 | 17 | 25 | 25 |
| Plating adhesion (N/cm) | 7.5 | 9.0 | 9.0 | 9.5 | 10 | 8.0 | 9.0 | 4.5 | 6.0 | 7.5 | 5.5 | 6.0 | 5.0 | 6.5 |
| Non-plating occurrence | ○ | ○ | ○ | ○ | ○ | ○ | ○ | X | ○ | ○ | ○ | ○ | X | ○ |
| Thermal cycle characteristics | ○ | ○ | ○ | ○ | ○ | ○ | ○ | X | X | ○ | X | X | X | X |

As shown in Table 2, in the cases of Examples 1 to 7, in which two types of ABS resins each containing rubber having different average particle diameters, a SAN resin, and a PMMA resin are included in respective proper amounts according to the present invention, melt indexes are appropriate and processability is excellent, and impact strength is not lowered. In addition, plating adhesion and thermal cycle characteristics are significantly improved in a plating process with reduced toxicity.

In particular, among Examples, when the PMMA resin (c) is contained in an amount of 5 to 10% by weight, plating adhesion is further improved in a plating process using a chromium-free etchant.

On the other hand, in the case of Comparative Example 1, in which the PMMA resin (c) is not contained, plating adhesion is significantly lowered in a plating process using a chromium-free etchant, and a non-plating phenomenon is not improved. In addition, based on the evaluation results of thermal cycle characteristics, bulges or cracks are present in a plating layer. Thus, the composition of Comparative Example 1 is not suitable for a plating process using a chromium-free etchant with reduced toxicity.

In addition, in the cases of Comparative Examples 2 and 5, in which an excess of the PMMA resin (c) is contained, as compared with Examples, mechanical strength is considerably reduced. In addition, non-plating is not detected, but plating adhesion is low, so that appearance after plating is not improved.

On the contrary, in the cases of Comparative Examples 6 and 7, in which the PMMA resin (c) is contained in small amount, mechanical strength is good, but plating adhesion and plating properties, such as a non-plating phenomenon and thermal cycle characteristics, are not improved.

In addition, in the cases of Comparative Examples 3 and 4, in which two types of ABS resins each containing rubber polymers having different average particle diameters are not used, and only one type of ABS resin is included, as compared with Examples, melt index, impact strength, and plating adhesion are considerably reduced. In particular, when an ABS resin only containing a large diameter rubber polymer is included alone (Comparative Example 4), as compared with Examples, thermal cycle characteristics are also low.

That is, when two types of ABS resins each containing rubber polymers having different average particle diameters, a SAN resin, and a PMMA resin are included in respective proper amounts, the inherent characteristics of ABS resins, such as mechanical strength and processability, are maintained, and plating adhesion and thermal properties are improved in a plating process with reduced toxicity, and a non-plating phenomenon is considerably reduced. In addition, since a plating process may be performed using a chromium-free etchant, the worker safety may be ensured, and an environmentally friendly process is possible.

The invention claimed is:

1. A plated thermoplastic resin composition, the thermoplastic resin composition comprising:
    a-1) 1 to 30% by weight of a first graft polymer obtained by graft-polymerizing an aromatic vinyl compound and a vinyl cyanide compound onto a conjugated diene rubber having an average particle diameter of 0.05 μm or more and less than 0.2 μm;
    a-2) 5 to 45% by weight of a second graft polymer obtained by graft-polymerizing an aromatic vinyl compound and a vinyl cyanide compound onto a conjugated diene rubber having an average particle diameter of 0.2 to 0.5 μm;
    b) 50 to 80% by weight of an aromatic vinyl compound-vinyl cyanide compound copolymer; and
    c) 1 to 10% by weight of a (meth)acrylic acid alkyl ester polymer,
    wherein the thermoplastic resin composition is a plating material, and a plating process using a chromium-free etchant is used to plate the thermoplastic resin composition.

2. The plated thermoplastic resin composition according to claim 1, wherein a weight ratio of the first graft polymer to the second graft polymer is 1:0.5 to 1:4.

3. The plated thermoplastic resin composition according to claim 1, wherein each of the first and second graft copolymers is obtained by graft-polymerizing 10 to 70% by weight of an aromatic vinyl compound and 1 to 30% by weight of a vinyl cyanide compound onto 20 to 80% by weight of a conjugated diene rubber.

4. The plated thermoplastic resin composition according to claim 1, wherein the aromatic vinyl compound-vinyl cyanide compound copolymer comprises 10 to 40% by weight of a vinyl cyanide compound.

5. The plated thermoplastic resin composition according to claim 1, wherein the aromatic vinyl compound-vinyl cyanide compound copolymer has a weight average molecular weight of 50,000 to 200,000 g/mol.

6. The plated thermoplastic resin composition according to claim 1, wherein the (meth)acrylic acid alkyl ester polymer is obtained by polymerizing one or more selected from methyl acrylate, ethyl acrylate, methyl methacrylate, ethyl methacrylate, and methyl ethacrylate.

7. The plated thermoplastic resin composition according to claim 1, wherein the (meth)acrylic acid alkyl ester polymer is a block copolymer composed of a (meth)acrylic acid alkyl ester polymer and an aromatic vinyl compound-vinyl cyanide compound copolymer; a master batch of a (meth)acrylic acid alkyl ester polymer using an aromatic vinyl compound-vinyl cyanide compound copolymer as a base resin; or both.

8. The plated thermoplastic resin composition according to claim 1, wherein the thermoplastic resin composition has a melt index (220° C., 10 kg) of 14 to 40 g/10 min according to ASTM D1238.

9. The plated thermoplastic resin composition according to claim 1, wherein the thermoplastic resin composition has a plating adhesion of 8.0 N/cm or more.

10. The plated thermoplastic resin composition according to claim 1, wherein a 6.4 mm thick sample of the composition has an impact strength of 20 kgfcm/cm$^2$ or more according to ASTM D256.

11. A method of manufacturing a plated part as in claim 1, wherein the part is a molded part, comprising:
    a step, in which the thermoplastic resin composition according to claim 1 is subjected to injection molding to obtain an injection-molded part;
    a step of etching the injection-molded part using the chromium-free etchant, the chromium-free etchant containing $KMnO_4$ and phosphoric acid; and
    a step of plating the etched injection-molded part by performing a plating process.

12. The molded and plated part according to claim 11, wherein the molded part comprises a substrate comprising the thermoplastic resin composition and a plating layer coated on a surface of the substrate, wherein the plating layer is bonded to the substrate via anchoring.

13. A molded and plated part, comprising the plated thermoplastic resin composition according to claim 1.

* * * * *